US009789745B2

(12) United States Patent
Richter et al.

(10) Patent No.: US 9,789,745 B2
(45) Date of Patent: Oct. 17, 2017

(54) AIR INTAKE WITH SINGLE DOOR AND THROTTLING FUNCTION

(71) Applicant: VISTEON GLOBAL TECHNOLOGIES, INC., Van Buren Township, MI (US)

(72) Inventors: Gerald Richter, Aachen (DE); Martin Paul Nowak, Rosrath (DE)

(73) Assignee: HANON SYSTEMS, Daejeon-si (KR)

( * ) Notice: Subject to any disclaimer, the term of this patent is extended or adjusted under 35 U.S.C. 154(b) by 492 days.

(21) Appl. No.: 13/795,697

(22) Filed: Mar. 12, 2013

(65) Prior Publication Data

US 2014/0141706 A1 May 22, 2014

(30) Foreign Application Priority Data

Mar. 13, 2012 (DE) .................. 10 2012 102 098

(51) Int. Cl.
| | |
|---|---|
| B60H 1/00 | (2006.01) |
| B60H 1/34 | (2006.01) |
| B60H 1/24 | (2006.01) |
| B60H 1/26 | (2006.01) |
| F24F 13/14 | (2006.01) |
| F24F 13/15 | (2006.01) |
| F25D 17/06 | (2006.01) |
| B60S 1/54 | (2006.01) |
| B60K 37/00 | (2006.01) |

(52) U.S. Cl.
CPC ..... *B60H 1/00457* (2013.01); *B60H 1/00685* (2013.01); *B60H 2001/00085* (2013.01)

(58) Field of Classification Search
None
See application file for complete search history.

(56) References Cited

U.S. PATENT DOCUMENTS

| | | | |
|---|---|---|---|
| 5,181,553 A * | 1/1993 | Doi .................. | B60H 1/00842 165/203 |
| 5,352,089 A * | 10/1994 | Tokunaga et al. ............ | 415/206 |
| 6,092,592 A * | 7/2000 | Toyoshima .......... | B60H 1/0005 165/204 |
| 6,270,400 B1 * | 8/2001 | Tsurushima et al. ......... | 454/121 |
| 6,386,966 B1 | 5/2002 | Kuwayama et al. | |
| 6,453,991 B1 * | 9/2002 | Tsurushima et al. ......... | 165/202 |
| 6,499,508 B2 * | 12/2002 | Sato .................. | B60H 1/00685 137/625.45 |
| 6,786,816 B2 * | 9/2004 | Murakami et al. ........... | 454/139 |

(Continued)

FOREIGN PATENT DOCUMENTS

| | | |
|---|---|---|
| DE | 4214862 C1 | 5/1993 |
| DE | 19915966 A1 | 10/1999 |

(Continued)

*Primary Examiner* — Gregory Huson
*Assistant Examiner* — Eric Gorman
(74) *Attorney, Agent, or Firm* — Shumaker, Loop & Kendrick, LLP; James D. Miller

(57) ABSTRACT

An air intake of an air conditioning system a motor vehicle having a fresh air duct configured to receive fresh air, a recirculated air duct configured to receive air from a passenger area of the motor vehicle, and an air outlet configured to channel the fresh air or the air from a passenger area of the motor vehicle to a blower. The air intake also has a valve disposed in the housing and rotates about a rotational axis between a first position and a second position.

10 Claims, 3 Drawing Sheets

(56) References Cited

U.S. PATENT DOCUMENTS

| | | | | |
|---|---|---|---|---|
| 6,981,690 | B2* | 1/2006 | Okumura et al. | 251/250 |
| 8,079,405 | B2* | 12/2011 | Shindoh | B60H 1/00028 |
| | | | | 165/202 |
| 8,091,623 | B2* | 1/2012 | Hackl | B60H 1/00685 |
| | | | | 165/103 |
| 2004/0211552 | A1* | 10/2004 | Seki | B60H 1/00042 |
| | | | | 165/202 |
| 2005/0056326 | A1* | 3/2005 | Oide | 137/625.48 |
| 2005/0116054 | A1* | 6/2005 | Richter et al. | 236/49.1 |
| 2007/0204985 | A1* | 9/2007 | Fukagawa | B60H 1/00685 |
| | | | | 165/203 |
| 2010/0093269 | A1* | 4/2010 | Sakaguchi et al. | 454/154 |
| 2010/0323602 | A1* | 12/2010 | Suematsu et al. | 454/157 |
| 2011/0114739 | A1* | 5/2011 | Misumi et al. | 236/49.3 |
| 2013/0042637 | A1* | 2/2013 | Richter et al. | 62/79 |
| 2014/0075974 | A1* | 3/2014 | Klein et al. | 62/119 |
| 2015/0306935 | A1* | 10/2015 | Shichiken | B60H 1/0005 |
| | | | | 165/47 |

FOREIGN PATENT DOCUMENTS

| | | |
|---|---|---|
| DE | 102004004165 B3 | 10/2005 |
| DE | 102006012604 A1 | 9/2007 |
| JP | 2000211339 A | 8/2000 |

\* cited by examiner

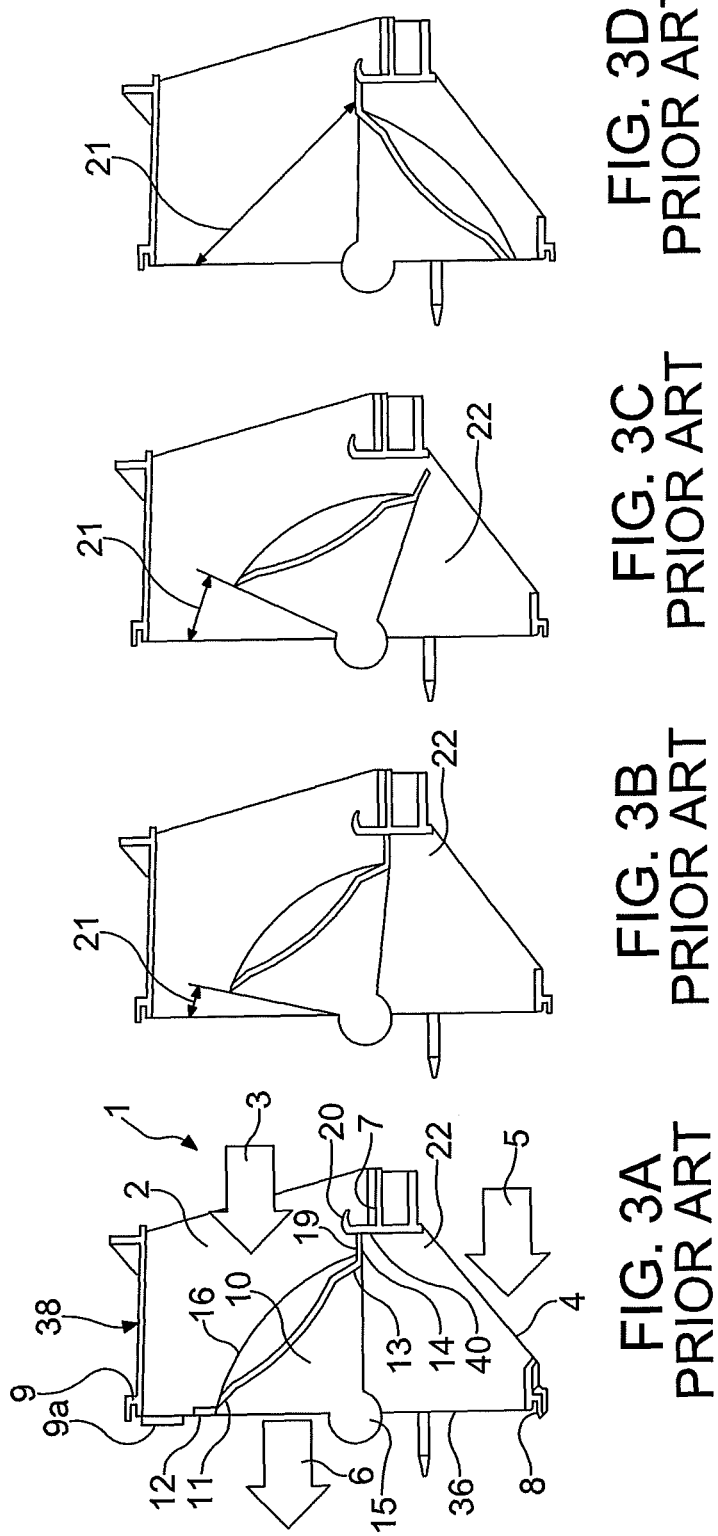

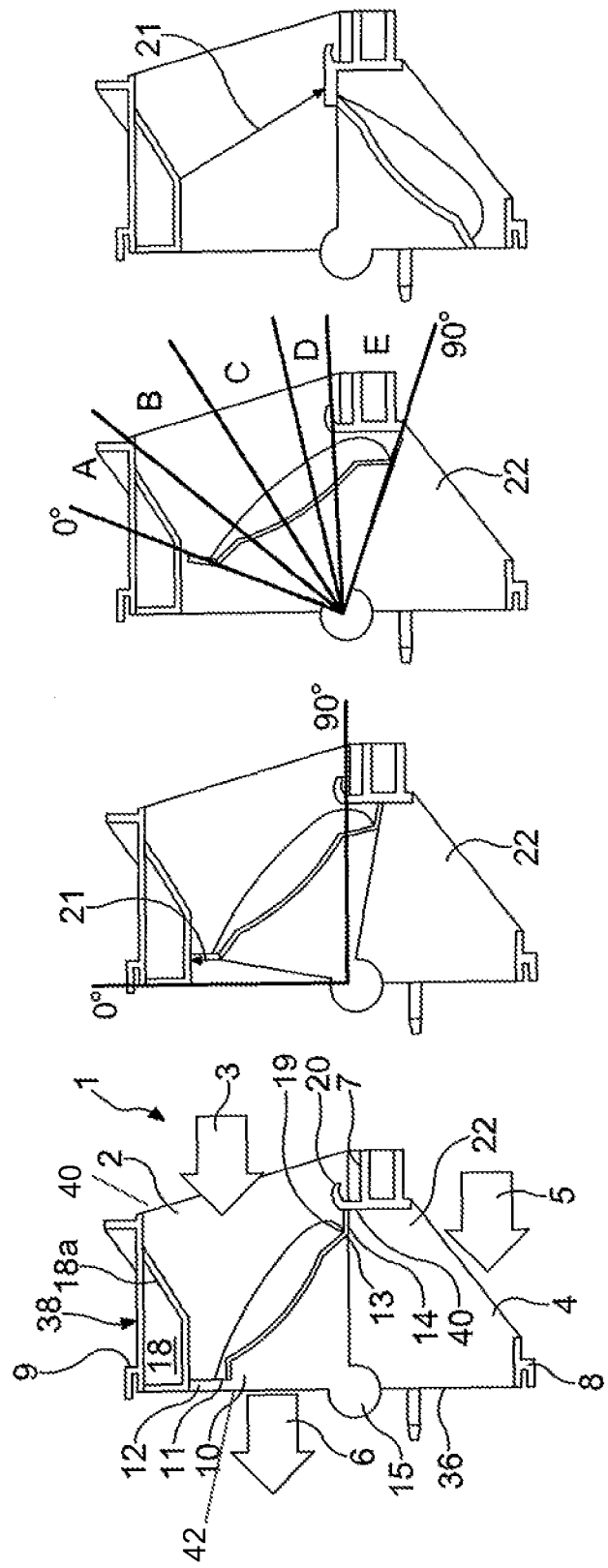

AIR INTAKE WITH SINGLE DOOR AND THROTTLING FUNCTION

CROSS-REFERENCE TO RELATED APPLICATION

This application claims priority to German Patent Application Serial No. DE 10 2012 102 098.1 filed on Mar. 13, 2012, hereby incorporated herein by reference in its entirety.

FIELD OF THE INVENTION

The invention relates to an air intake of an air conditioning system for a motor vehicle including a fresh air duct for admitting fresh air from the area surrounding the motor vehicle, a recirculation air duct for admitting air from inside the passenger area, an air outlet for discharging the air, and a valve.

BACKGROUND OF THE INVENTION

This section provides background information related to the present disclosure which is not necessarily prior art. In motor vehicles, due to increasing numbers of technical components and increasing requirements with regard to comfort, optimization is necessary in terms of both the structural volume and the functionality of the components. For example, large-displacement components for conditioning air, such as are known in stationary air conditioning systems in the form of combining chambers, flow channeling, and swirling apparatus, cannot be used in motor vehicles due to the limited space conditions. Moreover, it is desirable to reduce the number of components in air conditioning systems while at the same time increasing their efficiency.

Air conditioning systems of the prior art have air intake housings comprising an air intake for the outside air taken in from outside the passenger area of the vehicle, also referred to as fresh air, and an air intake for the recirculated air taken from inside the passenger area. The air is drawn by an air blower, via the intakes, into the air conditioning system, where it is conditioned and then conducted through suitable distribution openings into the passenger area.

The setting of a valve arranged inside the air intake housing determines whether the air that is drawn in consists of solely outside air, solely recirculated air, or a mixture of outside air and recirculated air. In most cases, the valve is mounted inside the housing so as to pivot between two end positions. The air flow that is drawn in can be combined by placing the valve in an intermediate position between the two end positions.

In air intake housings known in the prior art, when the valve is in intermediate positions between the air intake for outside air and the air intake for recirculated air, undesirable bypass mass flows are generated, in which outside air flows around the valve and is introduced, without conditioning, into the passenger area of the vehicle through the air intake for recirculated air. Such bypass mass flows allow outside air that is too cold or too warm, for example, to enter directly into the passenger area.

In the prior art, such undesirable bypass mass flows are countered by a housing comprising two valves, which are designed for blocking and opening up the air intake for outside air and the air intake for recirculated air.

However, the use of two valves increases the amount of installation space that is required and necessitates additional expenditures on control for coordinating the movement of the valves.

For example, DE 199 15 966 A1 discloses an air intake housing for a heating and/or air conditioning system of a motor vehicle. The air intake housing comprises an intake for outside air, an intake for recirculated air, an outlet connected to a fan, and a valve. The valve is mounted inside the housing so as to pivot between an outside air position and a recirculated air position, and can occupy intermediate positions. The air intake housing further comprises internal fins, which serve to channel the mass flow of outside air and the mass flow of recirculated air to the outlet of the housing. A direct passage of air from the outside air intake to the recirculated air intake is thereby prevented.

To achieve a consistent back pressure of the fresh air in the air intake duct at high vehicle speeds, and to counteract the air pressure in the passenger area, back pressure valves are installed in the region of the air intake since adjusting the speed of the blower to the vehicle speed is not sufficient for controlling the back pressure of the outside air, which is dependent on the vehicle speed. The back pressure valves therefore serve the purpose of back pressure compensation.

In the prior art, separate fresh air and recirculated air valves are provided, which are actuated via separate transmissions and/or supplementary servo motors.

Therefore, with conventional air intake housings having a single valve, which enables the settings "outside air" and "recirculated air" or "partially recirculated air" as intermediate settings, an additional, second valve is required for backpressure compensation. This is true particularly if in the "partially recirculated air" setting, part of the air is drawn in from the passenger area.

With backpressure compensation, the cross-section of the air intake is decreased based upon the vehicle speed, thereby decreasing the size of the air intake duct. Therefore, backpressure compensation is understood as a restriction of the high upstream pressure in the intake area of the air intake housing, which is generated by high vehicle speed.

DE 10 2006 012 604 A1 describes an air valve having a valve body in a vehicle air conditioning system. The valve body is composed of a valve framework and a molded foam piece attached thereto. The valve framework is adapted to the geometry of the closed cross-section of the air duct, and the molded foam body is adapted to the geometry of the air intake of the blower, and optionally to the opening geometry of the air duct to which it is assigned.

If the air valve is embodied as a backpressure valve, it will act both on the fresh air duct and on the recirculated air duct of the air conditioning system. The back pressure valve, which can be pivoted in front of the free flow area of the fresh air duct, restricts the flow of air passing through the opened fresh air duct and compensates for the back pressure generated at high vehicle speeds. Also provided is an additional cylinder valve, which surrounds the air valve with the same pivoting axis and serves as a fresh air/recirculated air valve.

However, it is desirable to avoid the use of two valves, for example, due to the excessive space requirement and high control costs associated therewith. Air conditioning systems comprising multiple valves are substantially more expensive and also require higher driving forces than air conditioning systems that comprise only one valve.

DE 10 2004 004 165 B3 discloses an air intake for a ventilation, heating or air conditioning system of a motor vehicle, comprising an outside air duct for supplying outside air, a recirculated air duct for supplying recirculated air, a pressurized air valve for controlling the outside air duct and a recirculated air valve for controlling the recirculated air duct. The recirculated air valve and the pressurized air valve are embodied as a combined ventilation valve, which enables a restriction of the mass air flow flowing through the outside air duct when the recirculated air duct is closed.

All the systems known in the prior art comprise additional elements at great instrumental expense, which also require additional space and a control system, resulting in higher costs, additional installation expenditure and corresponding maintenance requirements.

In addition, the valve geometries known in the prior art produce strong flow noises. By separating the flow and with swirling currents, the valves are excited to oscillation and vibration.

SUMMARY OF THE INVENTION

The problem addressed by the present invention is that of providing an air intake for an air conditioning system of a motor vehicle that will perform the functions of admitting fresh air and also recirculated air and partially recirculated air. In said air intake, when partially recirculated air is drawn in, continuous back pressure compensation that is dependent upon vehicle speed is to be provided, in order to ensure comfort inside the passenger area. Bypass flows from the fresh air intake to the recirculated air intake are to be prevented. The selective channeling of air should be implemented using a minimum number of components, in order to minimize the amount of installation space required and the resulting costs of control, manufacturing, installation and maintenance.

The problem is solved by an air intake for an air conditioning system of a motor vehicle, according to an embodiment of the invention. The air intake comprises a fresh air duct for the intake of fresh air from the area surrounding the vehicle, a recirculated air duct for the intake of air from the passenger area, and an air outlet for channeling the air to a blower. The air intake further comprises a valve for controlling the air mass flow.

The valve, which has a surface which an air mass flow strikes, is mounted inside a housing so as to pivot between two end positions. The pivotable mounting of the valve allows the valve to be adjusted to different intermediate positions. The fresh air duct is delimited by a housing wall, a dividing wall, and the surface of the valve.

In anther embodiment, the housing wall and the surface of the valve are embodied and arranged opposite one another such that the fresh air duct has a contour that tapers the flow area in the direction of flow of the fresh air. The contour enables the compensation of back pressure inside the fresh air duct. The overpressure in the fresh air duct is released completely in relation to the air outlet and therefore in relation to the blower.

The housing wall has a formation. The formation is embodied as having a first surface, which projects out of the housing wall, projects at an angle into the flow area of the fresh air duct, thereby decreasing the flow area, and a second surface connected to the surface that decreases the flow area in the direction of flow. The surface that is angled in relation to the direction of flow of the fresh air mass flow advantageously affects a uniform decrease in the flow area. In contrast to the first surface, the second surface is aligned in the direction of the housing wall.

The alignment of the second surface in the direction of the housing wall is understood to mean that the second surface is arranged parallel to the direction of flow of the fresh air mass flow inside the fresh air duct before it reaches the angled surface of the formation, or substantially parallel to the housing wall.

Another advantageous embodiment of the invention is that the surface of the valve is also embodied so as to minimize or prevent a direct passage of air as a bypass mass flow from the fresh air duct to the recirculated air duct. In addition to the backpressure compensation inside the fresh air duct, the surface of the valve, in conjunction with the dividing wall, enables a sealing of the recirculated air duct against the fresh air duct. In this connection, the intake area for the recirculated air is sealed in relation to the intake area for fresh air, which is under higher pressure, so that the fresh air is unable to enter the intake area for recirculated air. The seal between the surface of the valve and the dividing wall is guaranteed in different positions of the valve and in different speed ranges for the motor vehicle, with different levels of restriction of the fresh air.

Advantageously, the second surface of the formation, which is aligned in the direction of the housing wall, is embodied as contoured such that a gap between the valve and the second surface of the formation, which results from a rotational movement of the valve is adjusted based upon the restriction of the fresh air that is required.

The valve, which is embodied as a fresh air/recirculated air backpressure valve, is preferably mounted so as to rotate about a rotational axis. The valve can be rotated steplessly in one adjustment range, so that any intermediate positions between the end positions of the valve can be set. When the valve is placed in the first end position, the fresh air duct is completely closed and the recirculated air duct is completely opened. When the valve is placed in the second end position, the fresh air duct is completely opened and the recirculated air duct is completely closed. Therefore, in the first end position only fresh air is channeled through the air outlet, in the second end position only recirculated air is channeled through the air outlet, and in the intermediate positions a combination of fresh air and recirculated air can be channeled through the air outlet. The adjustment range preferably extends from 0° to 90°, in other words, from the first end position at 0° to the second end position at 90°.

The valve has a first longitudinal side and a second longitudinal side, wherein the longitudinal sides are aligned parallel to the rotational axis of the valve. According to another advantageous embodiment of the invention, the surface of the valve that extends between the longitudinal sides is embodied as having a contour that is different from the shape of a partial area of a shell-shaped, circular hollow cylinder at a constant distance of the surface from the rotational axis. The partial area of the surface of the valve preferably extends across an angle range of 0° to 90°. The contour that is different from the shell-shaped surface of a circular hollow cylinder, said surface being a constant distance from the rotational axis, has distances from the rotational axis that vary over the angular range. The surface of the valve can be subdivided cross-sectionally, perpendicular to the rotational axis, starting from the first longitudinal side and extending in the direction of the second longitudinal side, into separate regions.

The different regions of the surface of the valve are embodied as having a convex or concave curvature, or as flat or straight, for the purpose of achieving the required distances from the rotational axis. The first region preferably has a convexly curved surface. The second region adjoining the first region, the third region adjoining the second region, and the fourth region adjoining the third region are each embodied as having a straight surface. The surface of the fifth region, which adjoins the fourth region, is embodied as having a convex curvature.

According to a further embodiment of the invention, in the first and second regions, the distance of the surface from the rotational axis is decreased, whereas the distance in the third and fourth regions increases again, and remains constant in the fifth region. The areas of transition between the regions of the surface are embodied as constant. A surface having constant transition areas is understood as being a surface without cutting edges or other geometries that may influence flow, which surface generates only minimal resistance. The surface is also closed.

In the different regions, the contour is embodied such that, in the individual positions of the valve for "partially recirculated air", in other words, between the end positions, the air mass flow flowing through the fresh air duct is restricted, adjusted specifically to the vehicle, dependent upon the pressure in the fresh air duct.

The surface of the valve, which extends across an angle range of 0° to 90° is preferably subdivided such that the first region comprises an angle range of 0° to 12°, the second region comprises an angle range of 12° to 40°, the third region comprises an angle range of 40° to 55°, the fourth region comprises an angle range of 55° to 70°, and the fifth region comprises an angle range of 70° to 90°.

The contours of the housing wall and the surface of the valve advantageously allow the flow area of the fresh air duct in the direction of flow of fresh air to be restricted in various positions of the valve. The contours of the housing wall, which are opposite one another and delimit the flow area, along with the formation and the surface of the valve, are embodied as coordinated with one another in such a way that the flow area of the fresh air duct tapers advantageously in terms of fluid mechanics within a specific adjustment range of the valve.

According to one embodiment of the invention, the specific adjustment range lies within a range of rotation of the valve between the first end position at 0°, in which the fresh air duct is completely closed and the recirculated air duct is completely opened, and a maximum position at 23°, in which restriction still occurs. Within this range, the flow area is decreased in the shape of a funnel in each position of the valve.

The funnel-shaped decrease is achieved by means of surfaces of the formation of the housing wall that are aligned angled toward each other, and the surface regions of the valve in this adjustment range of the valve. The opposing surfaces in this case preferably have similar or identical values of the adjustment angle in relation to the direction of flow of the fresh air, wherein the signs thereof are opposite.

Advantageously, the valve closes increasingly with increasing speed, in order to maintain a constant flow of air through the air intake, and therefore through the air conditioning system, which is guaranteed by a varying restriction of the fresh air, adapted to the speeds of the vehicle, in different positions of the valve at different speed ranges for the motor vehicle.

One further embodiment of the invention is that the dividing wall that separates the fresh air duct from the recirculated air duct has an end face with a projection formed on said end face. The end face and the projection are arranged aligned in the direction of the surface of the valve such that the projection delimits a gap between the surface and the end face.

Particularly advantageous, the surface of the valve in conjunction with the projection of the dividing wall arranged opposite said surface form a gap that is constant within a certain adjustment range for the valve and has a minimal opening width so that the bypass mass flow between the fresh air duct and the recirculated air duct is prevented or is only minimal.

According to one embodiment of the invention, the specific adjustment range within a range of rotation of the valve lies between 0° and 23°.

In addition to the closing and opening of the fresh air duct, which restricts the mass flow of fresh air, within the preferred adjustment range of rotation of the valve of between 0° and 23°, the contour of the surface of the valve advantageously also results in a sealing of the intake area for recirculated air in relation to the intake area for fresh air, which is under greater pressure, so that the fresh air cannot flow over into the intake area for recirculated air. Therefore, the air mass flow through the fresh air duct is restricted, while at the same time, the bypass mass flow between fresh air duct and recirculated air duct is prevented or minimized.

A further advantageous embodiment of the invention consists in that seals are provided on the longitudinal sides of the surface of the valve. The seals, which extend all the way across the longitudinal sides and are securely attached to the valve, are designed to seal off the fresh air duct or the recirculated air duct, in conjunction with the valve, depending upon the position of the valve.

The solution according to the invention offers various advantages such as a cost-effective individual valve within the air intake, while maintaining high ventilation comfort. Another advantage is a decrease in play and forces resulting from the elimination of the valves and kinematics that are necessary in multi-valve systems, such as servo motors, transmissions and control systems, and therefore a reduction in cost by saving on additional kinematics. A further advantage is a decrease in the amount of installation space required and a decrease in susceptibility to malfunction and in the cost of producing, installing and maintaining the air conditioning system.

BRIEF DESCRIPTION OF THE DRAWINGS

The above, as well as other advantages of the present invention, will become readily apparent to those skilled in the art from the following detailed description of a preferred embodiment when considered in the light of the accompanying drawings described herein.

FIGS. 3A-3D illustrate the process of closing the recirculated air duct while simultaneously opening the fresh air duct with the recirculated air intake open and the fresh air intake closed and with a fresh air/recirculated air valve of the prior art; and FIGS. 4A-4D illustrate the process of closing the recirculated air duct while simultaneously opening the fresh air duct with the recirculated air intake open and the fresh air intake closed and with a fresh air/recirculated air back pressure valve.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

Figure 1:
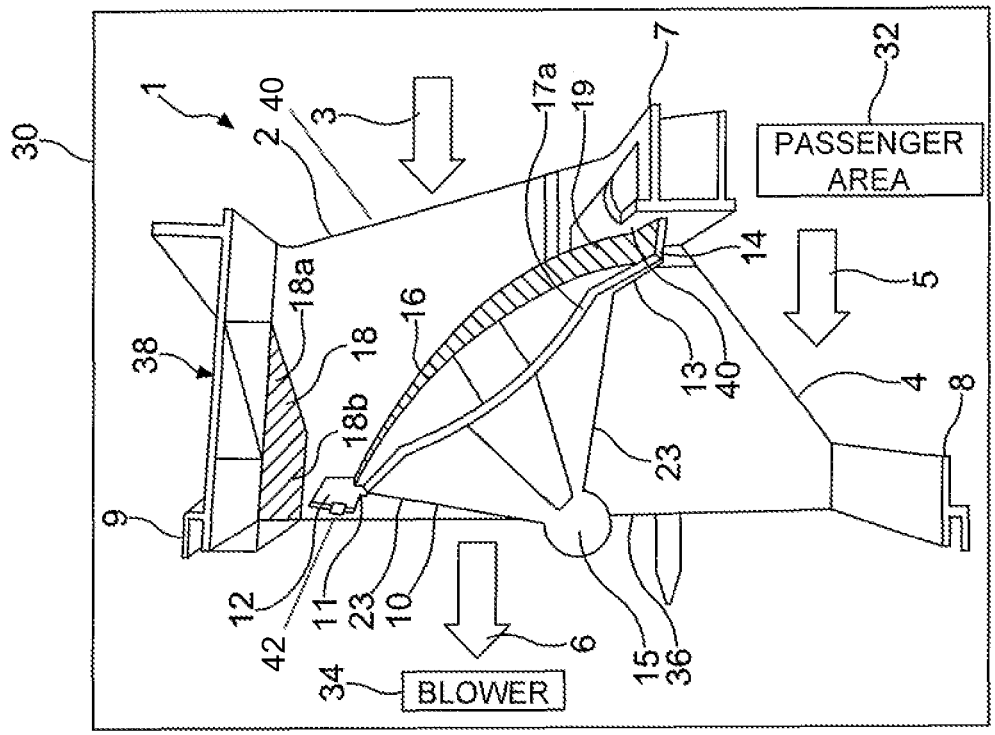
FIG. 1 is a schematic of an air intake for an air conditioning system with a fresh air/recirculated air valve from the prior art.

FIG. 1 shows an air intake 1, known in the prior art, in an air conditioning system for a motor vehicle 30, comprising a fresh air duct 2, a recirculated air duct 4 and a valve 10, which is embodied as a fresh air/recirculated air valve. The fresh air or outside air that is drawn in from the area surrounding the vehicle 30 through an inlet 40 of the fresh air duct 2 in the direction of flow 3 by means of a blower 34 and/or the recirculated air that is drawn in from a passenger area 32 by the recirculated air duct 4 in the direction of flow 5 are conducted by the blower 34, at an outlet 42 of the air intake 1 and fresh air duct 2, through a duct in the direction of flow 6.

The fresh air duct 2 and the recirculated air duct 4 are separated from one another by a dividing wall 7. The air intake 1 further comprises a housing 38, wherein the housing wall 8 and dividing wall 7 delimit the recirculated air duct 4 on opposite sides, and housing wall 9 and dividing wall 7 delimit the fresh air duct 2 on opposite sides.

The air mass flow that is drawn by means of the blower 34 through the air intake 1 into the air conditioning system is then conditioned, in other words, cooled, dehumidified and/or heated, for example, before being introduced through air outlets into the passenger area 32.

The valve 10, which is secured to the housing 38 of the air conditioning system, is mounted so as to pivot between two end positions, a recirculated air position and a fresh air position, or is mounted so as to rotate steplessly about a rotational axis 15 within an adjustment range of 0° to 90°. In the recirculated air position shown in FIG. 1, in which the valve 10 is positioned at an adjustment angle α of close to 0°, the valve 10 closes off the fresh air duct 2 completely, while the recirculated air duct 4 is completely opened. In the fresh air position not shown in FIG. 1, in which the valve 10 is positioned at an adjustment angle α of 90°, the valve 10 closes off the recirculated air duct 4 completely, while the fresh air duct 2 is completely opened.

The valve 10 is embodied in the shape of a section of a shell-shaped, circular hollow cylinder, with the axis of the hollow cylinder corresponding to the rotational axis 15. The valve 10 has a cylindrical, curved surface 16, which extends in section transversely to the rotational axis 15 along a radius around the rotational axis 15. The valve 10 is impinged on the convex side of the cylindrical shape. The convex shape of the surface 16 that is impinged, in conjunction with the opposite, flat-surface housing wall 9, produces a tapering of the free flow area, wherein the decrease in the flow area diminishes as it approaches the outlet.

To prevent backflow areas of the air, and therefore swirling and back pressure regions, in the concave region of the valve 10 as air flows around the cylindrically curved surface 16 of the valve 10, and to avoid restrictive effects and the generation of noise, the valve is embodied as closed on the longitudinal sides 11, 13 of the partial section of the hollow cylindrical wall. In this connection, a closed wall 23 extends between the longitudinal sides 11, 13 of the partial section of the hollow cylindrical wall, which sides are aligned parallel to one another and in the direction of the rotational axis 15, and the rotational axis 15. The wall 23 extends in its cross-section along the radius of the valve 10 from the rotational axis 15 up to the longitudinal sides 11, 13 of the curved surface 16 of the valve 10.

On the longitudinal sides 11, 13 of the surface 16, seals 12, 14 are arranged, which extend all the way along the longitudinal sides 11, 13 and are securely attached to the valve 10. The seals 12, 14 close off the fresh air duct 2 and the recirculated air duct 4, when the valve 10 is located in one of the end positions at 0° or 90°.

In the recirculated air position, the seal 12 seals off the fresh air duct 2 between the valve 10 and the housing wall 9, while the seal 14 seals off the fresh air duct 2 between the valve 10 and the dividing wall 7. In this case, the seal 12 rests on a land 9a that is formed on the housing wall 9. In the fresh air position, which is not shown in FIG. 1, the seal 12 seals off the recirculated air duct 4 between the valve 10 and the dividing wall 7, while the seal 14 seals off the recirculated air duct 4 between the valve 10 and the housing wall 8.

With the stepless pivoting of the valve 10 between the end positions, any intermediate positions can be adjusted, so that either only fresh air, only recirculated air, or a mixture of fresh air and recirculated air, also called partially recirculated air, is channeled through an air outlet 36 to the blower 34. A continuous movement of the valve 10 causes the continuous opening of the fresh air duct 2 with the simultaneously continuous closing of the recirculated air duct 4, or the continuous opening of the recirculated air duct 4 with the simultaneously continuous closing of the fresh air duct 2. With the embodiment of the valve 10 according to FIG. 1 alone, back pressure compensation is not possible.

Figure 2:
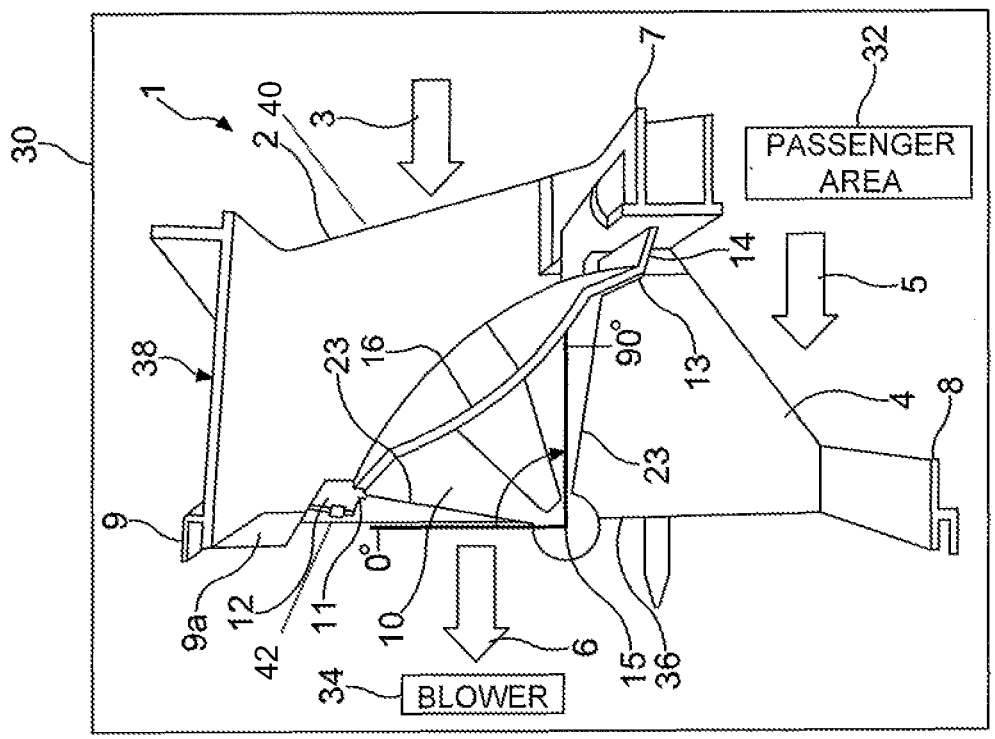
FIG. 2 is a schematic of an air intake for an air conditioning system with combined fresh air/recirculated air back pressure valve, with the recirculated air intake open and the fresh air intake closed.

FIG. 2 shows an embodiment of the air intake 1 according to the invention. The components already described in reference to FIG. 1 are identified by the same reference signs.

In contrast to the embodiment known in the prior art according to FIG. 1, the valve 10 is embodied as a fresh air/recirculated air backpressure valve and the housing wall 9 is embodied as contoured.

The housing wall 9 has a formation 18 that further tapers the free flow area of the fresh air duct 2 in the direction of flow 3 of the fresh air. In conjunction with the convex shape of the impinged surface 17a of the valve 10 opposite the housing wall 9 having the formation 18, said surface being different from a shell-shaped surface of a circular hollow cylinder, the flow area of the fresh air duct 2 is tapered in the shape of a funnel in the direction of flow 3 of the fresh air. The flow area is decreased on both sides, in other words, both by the shape of the surface 17a of the valve 10 and by the formation 18 of the housing wall 9. The formation 18 is embodied such that the flow area is continuously and constantly decreased, and when a certain position of the valve 10 is reached, is influenced only by the shape of the surface 17a of the valve 10. Depending upon the position of the valve 10, the decrease in the flow area decreases as it approaches the outlet.

Therefore, the formation 18 that extends over the entire width of the housing wall 9 has a surface 18a in the direction of flow 3 of the fresh air, which surface projects from the housing wall 9 that is embodied as flat-surfaced, and projects at an angle into the flow area, so that the flow area decreases continuously, regardless of the position of the valve 10. Alternatively, the surface 18a that projects into the flow area is embodied as straight or contoured. The width of the housing wall 9 is understood to include the extension perpendicular to the direction of flow of the air, in other words, in the direction of the rotational axis 15.

The flow area connected to the flow area that is tapered by the surface 18a of the formation 18 is aligned at an angle and is formed by a straight surface 18b that is aligned parallel to the housing wall 9. The dimensions of the former flow area are dependent only on the impinged surface 17a of the valve 10. Surface 18*b*, in conjunction with seal 12, is embodied as a seal surface or as a gap delimiting surface. When the valve 10 is rotated, the fresh air duct 2 is sealed between the surface 18*b* and the seal 12 until the seal 12 becomes separated from the surface 18*b* of the housing wall 9. The sealing surface is straight by contrast as a result of the curved surface 17*a* of the valve 10. The gap that forms between seal 12 and the surface 18*b* when the seal 12 is separated from the surface 18*b* remains nearly constant and becomes only minimally larger until the transition from surface 18*b* to surface 18*a* of the formation 18 is reached. The surfaces 18*a* and 18*b* of the formation 18 are arranged and contoured, based upon the vehicle 30 boundary conditions, such that a suitable restriction that is dependent upon the vehicle 30 speed results.

In the first range of rotational movement of the valve 10 from the first end position at 0°, the cross-section that effects the restriction between the surface 18*b* and seal 12 is formed. If the surface 18*b* is embodied as straight or flat, the gap that forms as a result of the rotational movement of the valve 10 becomes continuously larger as a result of the circular movement of the seal 12. The shape of the gap can be adjusted by means of the surface 18*b*.

The valve 10, which is embodied as a fresh air/recirculated air back pressure valve and has a surface 17*a*, the shape of which deviates from that of a section of a circular hollow cylinder, has a rotational axis 15. The deviations relate to a surface 16, embodied in a section perpendicular to the rotational axis 15 as cylindrical. As compared with the valve according to FIG. 1, the cylindrical surface 16 of the valve 10 according to FIG. 2 has an expanded area. The expansion is configured in the shape of a wedge that is curved about the rotational axis 15, such that the tip of the wedge rests on the first longitudinal side 11 of the section of the shell-shaped hollow cylinder on which the seal 12 is arranged. As the distance from the first longitudinal side 11 of the section of the shell-shaped hollow cylinder increases in the direction of the second longitudinal side 13, on which the seal 14 is arranged, the thickness of the wedge increases. Alternatively, the wedge has a constant radius over a larger region and is therefore embodied in the shape of a hollow cylinder in order to implement the seal in relation to the dividing wall 7.

As a result, an improvement in the seal between the surface 17*a* of the valve 10 and the dividing wall 7 when the fresh air duct 2 is closed or only slightly opened is achieved. The size of the gap 19 to be sealed in this process is minimized, so that the bypass mass flow of fresh air from the fresh air duct 2 to the recirculated air duct 4 is prevented or minimized.

The advantages of the embodiment of the air intake 1 according to the invention are also clear from the opposing illustrations of FIGS. 3A to 3D and 4A to 4D, which show the process of closing the recirculated air duct 4 while simultaneously opening the fresh air duct 2 by means of the valve 10. FIGS. 3A to 3D show the process with a fresh air/recirculated air valve known in the prior art, and FIGS. 4A to 4D show the process with a fresh air/recirculated air back pressure valve of an embodiment of the air intake 1 according to the invention. The process is illustrated starting from the first end position of the valve 10, shown in FIGS. 3A and 4A, moving through two intermediate positions (FIGS. 3B, 3C and 4B, 4C), up to the second end position of the valve 10 shown in FIGS. 3D and 4D.

FIGS. 3A and 4A show the valve 10, in each case in the first end position at 0°, in which the fresh air duct 2 is closed and the recirculated air duct 4 is opened. The seal 12 seals the fresh air duct 2 between the valve 10 and the housing wall 9, wherein the seal 12, shown in FIG. 3A, rests against the land 9*a* of the housing wall 9 and the seal 12, shown in FIG. 4*a*, rests against the surface 18*b* of the formation 18. In each case, the seal 14 seals the fresh air duct 2 between the valve 10 and the dividing wall 7, wherein the seal 14 rests on an end face 40 of the dividing wall 7 and below a projection 20 that is formed on the end face 40 of the dividing wall 7. In the section perpendicular to the rotational axis 15, the projection 20 has an acutely angled shape, wherein the end face 40 of the dividing wall 7 and the tip of the projection 20 are aligned in the direction of the surface 16, 17*b* of the valve 10. Between the projection 20 and the surface 16, 17*b*, a gap 19 is formed. The seal 14 rests in the area of transition from the end face 40 of the dividing wall 7 to the projection 20.

As is clear from FIG. 4A, in this position of the valve 10, the angled surface 18*a* of the formation 18 and the surface 17*b* of the valve 10 have similar or identical values for the adjustment angle in relation to the direction of flow 3 of the fresh air, with the values for the adjustment angle merely having different signs. Consequently, the flow area of the fresh air duct 2 is tapered on both sides in the shape of a funnel. The area of the fresh air duct 2 that connects thereto is delimited by the surface 18*b* and the surface 17*b* of the valve 10, wherein the decrease in the flow area is affected only by the embodiment of the surface 17*b*. The smallest free flow area is achieved at the outlet at the level of the seal 12.

The valve 10, shown in FIG. 4A to 4D, as a fresh air/recirculated air back pressure valve also has the surface 17*b*, which is different from the shape of a section of a shell-shaped, circular hollow cylinder, with a constant distance of the surface from the rotational axis 15. The section of the cylinder which forms the surface 17*b* of the valve 10 comprises an angle range of 0° to 90°. The surface 17*b* has regions with varying distances from the rotational axis 15. Starting from the first longitudinal side 11, on which the seal 12 is arranged, the surface 17*b* is embodied as initially convexly curved in the direction of the second longitudinal side 13, on which the seal 14 is arranged. This region A of the surface 17*b* covers an angle range of 0° to 12°. The regions B, C and D that adjoin the region A each have nearly straight, uncurved surfaces. The curvature of the surfaces is very low or zero. Regions B, C and D, in that order, cover angle ranges of 12° to 40°, 40° to 55° and 55° to 70°. The distance of the surface 17*b* from the rotational axis 15 of the valve 10 decreases in regions A and B and increases again in regions C and D. Region E, which covers an angle range of 70° to 90°, adjoins region D of the surface 17*b*, wherein the distance of the surface 17*b* from the rotational axis 15 of the valve 10 is constant in region E. In region E, the surface 17*b* is convexly curved in the shape of an outer surface of a circular cylinder. The transition areas of the surface 17*b* between regions A, B, C, D and E are embodied as constant. The recirculated air duct 4 is fully opened and has a maximum flow area 22.

FIGS. 3B and 4B each show a first intermediate position of the valve 10. The fresh air duct 2 is now slightly opened, while the recirculated air duct 4 is opened with a maximum flow area 22. With the same position or rotation of the valve 10, the flow area 21 of the fresh air duct 2 according to FIG. 3B is already opened wider than the flow area 21 of the fresh air duct 2 according to FIG. 4B. The formation 18 of the housing wall 9 according to FIG. 4A to 4D, particularly the surface 18*b*, prevents a wide opening of the flow area with a small rotation of the valve 10. As the valve 10 is rotated, the fresh air duct 2 is sealed between the surface 18*b* and seal 12 until the seal 12 becomes separated from the surface 18*b* of the housing wall 9 as a result of the rotation of the valve 10.

As is clear from FIG. 4B, in this position of the valve 10, the angled surface 18*a* of the formation 18 and the surface 17*b* of the valve 10 also have a similar or identical adjustment angle in relation to the direction of flow 3 of the fresh air, so that the flow area of the fresh air duct 2 decreases on both sides in the shape of a funnel. The smallest open flow area is achieved, as is clear from the end position of the valve according to FIG. 4A, at the outlet at the level of the seal 12, wherein the seal 12 no longer rests on the surface 18*b* and enables an opening of the fresh air duct 2 to the outlet.

According to FIG. 3B, the gap 19 between the dividing wall 7 and the valve 10 is already opened. The seal 14 no longer rests on the end face 40 of the dividing wall 7. An undesirable bypass mass flow flows from the fresh air duct 2 into the recirculated air duct 4, which increases even further as a result of increasing pressure differences between the fresh air duct 2 and the recirculated air duct 4 at increasing vehicle speeds.

With the embodiment of the valve 10 as a fresh air/recirculated air back pressure valve according to FIG. 4B, this bypass mass flow is minimized or prevented. The surface 17*b* of the valve 10 is embodied such that the gap 19 between the surface 17*b* and the projection 20 is closed or has only a minimal value, so that the air mass flow flowing through the fresh air duct 2 between the seal 12 and the surface 18*b* is restricted, while at the same time, the bypass mass flow to the recirculated air duct 4 is minimized.

FIGS. 3C and 4C each show a second intermediate position of the valve 10. The flow area 21 of the fresh air duct 2 is greater than in the first intermediate position according to FIG. 3B or 4B, whereas the flow area 22 of the recirculated air duct 4 is decreased.

However, with the same rotation of the valve 10, the flow area 21 of the fresh air duct 2 according to FIG. 3C was opened substantially wider than the flow area 21 of the fresh air duct 2 according to FIG. 4C. Also in the comparison of the first to second intermediate positions according to FIGS. 3B and 3C, the flow area 21 of the fresh air duct 2 is substantially larger than in the comparison of the flow areas 21 of the fresh air duct 2 according to FIGS. 4B and 4C.

With the rotation of the valve 10, the formation 18 of the housing wall 9 according to FIGS. 4B to 4D prevents the flow area 21 from opening beyond a certain degree. The gap that forms between the seal 12 and the surface 18*b* of the formation 18 remains nearly constant. Only when the valve 10 is rotated over an adjustment angle α of 23° does the flow area 21 of the fresh air duct 2 open at an increasing rate. When the valve 10 is moved over an adjustment angle α of approximately 23°, the seal 12 sweeps over the area of transition from the surface 18*b* to the surface 18*a* of the formation 18 with the further rotation of the valve 10. In the region of the adjustment angle α of approximately 23°, the air mass flow that is conducted through the fresh air duct 2 is heavily restricted.

The flow area of the fresh air duct 2 in the direction of flow 3 of the fresh air is tapered in the shape of a funnel within an adjustment range for the valve 10 of 0° to 23°. Within this adjustment range for the valve 10, the angled surface 18*a* of the formation 18 and the surface 17*b* of the valve 10 have similar or identical adjustment angles in relation to the direction of flow 3 of the fresh air. The smallest open flow area, as is shown with the end position of the valve 10 as illustrated in FIG. 4A or the position according to FIG. 4C, is achieved in the region of the seal 12, wherein the seal 12 is arranged at the transition of the angled surface 18*a* to the surface 18*b* of the formation 18. The surfaces 18*a* and 18*b* are arranged and contoured, dependent upon the vehicle boundary conditions, such that a suitable restriction results, dependent upon the vehicle speed.

In addition to the selective, uniform decrease in the flow area of the fresh air duct 2, the valve 10 embodied as a fresh air/recirculated air back pressure valve according to FIG. 4C minimizes or prevents the bypass mass flow between fresh air duct 2 and recirculated air duct 4, since the contour of the surface 17*b*, particularly the contour of region E of the surface 17*b*, closes off or minimizes the gap 19 between surface 17*b* and the projection 20. Until the valve 10 reaches the position in which the seal 12, by a rotation of the valve 10, sweeps over the area of transition from surface 18*b* to surface 18*a* of the formation 18, the gap 19 also remains closed. The air mass flow flowing through the fresh air duct 2 is restricted, while at the same time the bypass mass flow is minimized. The overpressure of the air in the fresh air duct 2 is released in relation to the air in the recirculated air duct 4 or the air mass flow to the blower 34. The surface 17*b* of the valve 10 in region E, in combination with the projection 20 arranged opposite the surface 17*b*, is embodied such that the gap 19 is constant and minimal within an adjustment range for the valve of 0° to 23°.

The selective contouring of the housing 38 on the housing wall 9 by means of the formation 18 enables the decrease in the flow area 21 of the fresh air duct 2, and therefore of the intake area for fresh air, within certain adjustment ranges of the valve 10. Said contouring is embodied such that a complete release of the overpressure in the fresh air duct 2 in relation to the blower 34 is enabled.

At the same time, the contouring of the valve 10 with the expansion of the surface 17*a*, 17*b* within these adjustment ranges results in a sealing of the intake area for recirculated air into the recirculated air duct 4 in relation to the intake area for fresh air into the fresh air duct 2, which is under higher pressure, so that the fresh air is unable to pass through into the intake area for recirculated air, and a bypass mass flow is prevented.

The contouring is adapted to different positions of the valve 10, and at the same time to different vehicle speed ranges, with a variable restriction of the fresh air. In this adaptation, the valve 10 increasingly closes the fresh air duct 2 for the purpose of maintaining a constant throughput of air through the air conditioning system as the vehicle speed increases.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An air intake of an air conditioning system of a motor vehicle, comprising:
   a fresh air duct configured to receive fresh air;
   a recirculated air duct configured to receive air from a passenger area of the motor vehicle;
   an air outlet configured to channel at least one of the fresh air and the air from the passenger area of the motor vehicle to a blower;
   a housing having a housing wall, a dividing wall, and a formation, the formation having a surface protruding from a portion of the housing wall into the fresh air duct and narrowing an opening area of the fresh air duct in a direction with respect to a flow of the fresh air, wherein the formation has a first surface portion and a second surface portion continuous with the first surface portion, wherein the first surface portion projects into the opening area of the fresh air duct at an angle from the housing wall towards the second surface and the second surface portion is parallel to the portion of the housing wall; and a valve having a surface extending between a first longitudinal side and a second longitudinal side thereof and a rotational axis, the valve disposed in the housing and rotatable about the rotational axis between a first position and a second position, wherein the surface of the valve at the first position cooperates with the housing wall and the formation to narrow the opening area of the fresh air duct, wherein the surface of the valve at the first position is in contact with the formation, and wherein the valve is positioned in the housing at a convergence of the fresh air duct and the recirculated air duct, and wherein the valve opens or closes the fresh air duct and the recirculated air duct, wherein the surface of the valve at the first longitudinal side of the valve is in contact with the second surface portion of the formation during an initial rotation of the valve from the first position to a first intermediate position between the first position and the second position, and wherein the surface of the valve at the first longitudinal side of the valve aligns with and cooperates with the second surface portion of the formation to form a substantially constant gap during a rotation of the valve between the first intermediate position and a second intermediate position between the first intermediate position and the second position;

wherein the formation extends from the housing wall along an entire width of the housing wall and along a length of the housing wall extending from an inlet of the fresh air duct to an outlet of the fresh air duct.

2. The air intake of claim 1, wherein the surface of the valve at the first position is configured to militate against fresh air flowing to the recirculated air duct.

3. The air intake of claim 2, wherein the initial rotation is between about 0 degrees and about 12 degrees.

4. The air intake of claim 1, wherein at the first position the valve restricts the fresh air flowing through the fresh air duct and the air flowing through the recirculated air duct is configured to flow at maximum volume, and wherein at the second position the valve restricts the air flowing through the recirculated air duct and the fresh air flowing through the fresh air duct flows at maximum volume.

5. The air intake of claim 1, wherein the first longitudinal side is positioned at about a 90° angle from the second longitudinal side, and a distance from the rotational axis to the surface of the valve varies across the 90° angle.

6. The air intake of claim 5, wherein a cross section of the surface of the valve perpendicular to the rotational axis has a first region, a second region, a third region, a fourth region, and a fifth region, the first region is adjacent the first longitudinal side and has a convex shape in a radially outward direction, the second region, the third region, and the fourth region are intermediate the first region and the fifth region and are substantially linear, the fifth region is adjacent the second longitudinal side and has a convex shape in a radially outward direction, and wherein the distance from the rotational axis to the surface decreases from the first region to the second region along the 90° angle, increases from the third region to the fourth region along the 90° angle, and remains substantially constant in the fifth region along the 90° angle.

7. The air intake of claim 1, wherein the surface of the valve cooperates with the surface of the formation of the housing to funnel a flow of the fresh air flowing in the fresh air duct.

8. The air intake of claim 1, further comprising an end face disposed on the dividing wall, the end face having a projection formed thereon, wherein the end face and the projection militate against a gap forming between the valve and the end face such that air received from the fresh air duct is restricted from flowing into the recirculated air duct and air received from the recirculated duct is restricted from flowing into the fresh air duct when the valve is rotated between an angle of about 0° and about 23°.

9. The air intake of claim 1, further comprising seals disposed on the first longitudinal side and the second longitudinal side of the valve, wherein the seals militate against the flow of the air received by the fresh air duct when the valve is in the first position and militate against flow of the air received by the recirculated air duct when the valve is in the second position.

10. The air intake of claim 1, wherein the first longitudinal side of the valve is perpendicular to the second surface portion of the formation at the first position of the valve.

* * * * *